July 29, 1958     C. B. SPASE     2,844,972

VIBRATION DAMPER

Filed Oct. 16, 1953

INVENTOR
Charles B. Spase,

BY    Karl W. Flocks

ATTORNEY

United States Patent Office 2,844,972
Patented July 29, 1958

2,844,972

VIBRATION DAMPER

Charles B. Spase, Syracuse, N. Y., assignor to Lipe-Rollway Corporation, Syracuse, N. Y., a corporation of New York Application October 16, 1953, Serial No. 386,598

8 Claims. (Cl. 74—574)

This invention relates to apparatus for damping torsional vibrations in engine crank shafts. More particularly, the present invention relates to a torsional vibration damping system for multi-cylinder internal combustion engines wherein torsional vibrations occurring in engine crank shafts are automatically absorbed regardless of the operating conditions of the crank shaft.

In the operation of multi-cylinder internal combustion engines, it is known that the crank shaft of the engine is subjected to an interrupted but concentrated force which is brought about by the movement or exciting action of the several pistons and connecting rods operatively connected to the crank shaft. The continuous application of the interrupted force on the crank shaft results in torsional deformations which can figuratively be described as an oscillatory movement of the crank shaft. Unless a suitable damper is provided, a considerable reduction in the effective total torque transmitted by the chank shaft will result and moreover the oscillations or vibrations of the crank shaft can result in destruction of the engine parts, due to fatigue.

Prior to the instant invention, several types of dampers have been utilized for damping out the torsional vibrations occurring in engine crank shafts. However, these heretofore known dampers have not been completely successful in absorbing the torsional vibrations occurring in the engine crank shaft under all and varying conditions of load and speed. One pioneer device employed for damping torsional vibration in internal combustion engines is known as the Lanchester damper and consists of a weighted inertia member disposed about the engine crankshaft and adapted to rotate with the hub thereof through a frictional coupling. Since the friction connection opposes relative movement between the hub and the inertia member part of the energy of a vibration occurring in the crank shaft is transformed by the friction into heat and dissipated by radiation, thus the total inertia of the system is decreased and the vibration is theoretically damped. Although the Lanchester damper has been found satisfactory for damping torsional vibrations under certain conditions of load and speed, it has been found that when the conditions are changed, the relative motion between the inertia member and hub is not sufficient to adequately damp out the vibrations resulting from the change in crank shaft conditions. In order to provide for the increase of the dissipation of energy in a given damping system, tuned springs have been mounted between the inertia member and the crank shaft hub. However, the tuned spring dampers have not been found to effectively vary the torsional vibrations occurring when the crank shaft is operating under varying conditions.

Another damper developed for the purpose of reducing oscillations in engine crank shafts is the centrifugal pendulum or bifilar system of pendulum counterweight suspension. Centrifugal pendulums employ counterweights or pendulum masses which are suspended on roller elements engaging surfaces of pairs of spaced bores formed in a mass supporting member and in the mass itself. The counterweights in such a construction theoretically assume a simple pendulum motion when the mass is subjected to centrifugal forces. The centrifugal pendulums are tuned to the frequencies of the vibrations occurring in the engine crank shaft and thus are theoretically adapted to rock at the same frequency in which the vibrations occur. The force set up by the pendulum in opposition to the torsional vibrations will then under certain conditions damp out the vibrations. Centrifugal pendulums have been found to be excellent dampers for the purpose so employed but they are not adapted to damp out vibrations occurring in the engine crank shaft when the speed of the crank shaft or the load on the crank shaft is changed or increased, which conditions are present when the engine is supplying a different or high torque demand. Since the centrifugal pendulums are tuned to the frequencies of the exciting torque unless a large number of types of counterweights are provided, the system will not be effective under actual varying conditions and such a system would be impractical.

Torsional vibration dampers utilizing the principle of the hydraulic coupling have also been employed but have been found to be impractical for all and varying conditions of operation of the crank shaft. Hydraulic dampers include a driving member and a driven member, the driving member being secured to the engine crank shaft. The coupling is enclosed by a housing; and a fluid, usually silicone oil, is interposed between the two members. The driven member, which constitutes a mass, is retarded from free movement around the driving member by the friction of the viscous fluid. The fluid is subjected to centrifugal force and thus a circulation is set up which causes the driving member to drive the driven member. However, the speed of the driven member is less than the driving member and any vibrations occurring in the crank shaft will then be damped by reason of the relative movement of the coupling elements. Hydraulic dampers may be sufficient for limited purpose use since they are designed to damp torsional vibrations occurring only at certain fixed conditions.

None of the dampers heretofore associated with internal combustion engines provide for the assimilation of vibrations occurring at high frequencies which result from accelleration of the engine when it is supplying a high torque demand. The torsional oscillations at high engine speed require that the damper be capable of absorbing the higher frequencies within its mass. The amplitudes of such vibrations are of lower value because the total displacement is less due to centrifugal force and gyroscopic action resulting with a higher speed of the engine, and this condition imposes a burden which has not been successfully carried by prior damping systems.

It is an object of the instant invention to teach a novel system for damping torsional vibrations in engine crank shafts.

It is a further object to teach a practical torsional vibration damping system effective to assimilate vibrations occurring at high frequencies.

It is another object to provide a novel damping structure for multi-cylinder internal combustion engines capable of effectively assimilating torsional vibrations under varying conditions of engine operation including high speed and high load.

Other objects and the nature and advantages of the instant invention will be apparent from the following description taken in conjunction with the accompanying drawings, wherein.

Figure 1:
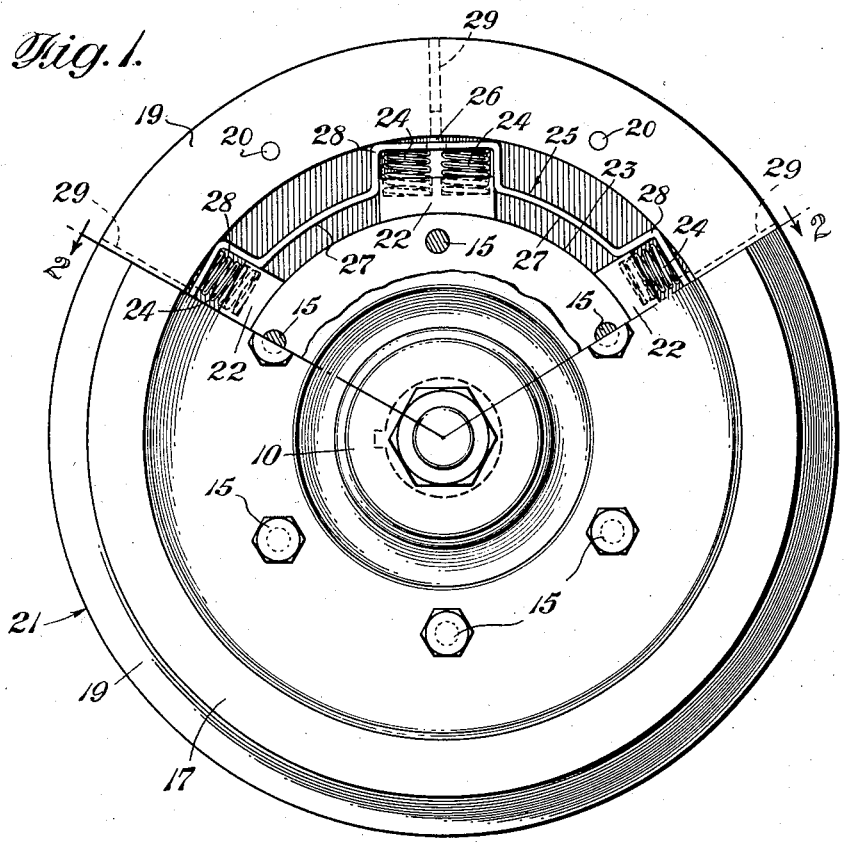
Figure 1 is a view in elevation of the damper assembly with a portion cut away.
Figure 2:
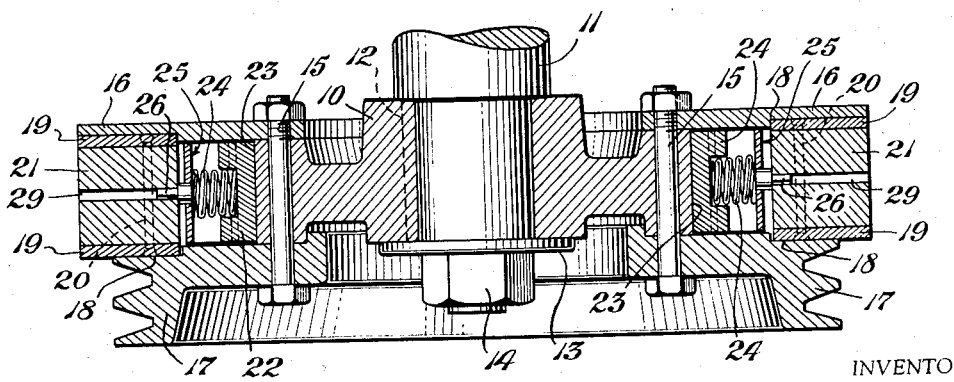
Fig. 2 is a sectional view of the structure shown in Fig. 1 taken along line 2—2 and looking in the direction of the arrows.

Referring to the drawings, the damping system driving member 10 is secured to the engine shaft 11 by means of the spline 12, washer 13 and nut 14. Locked to the damping system driving member 10 by the bolts 15 is the annular retaining disc 16 and the annular retaining member 17 which may be formed to serve as a pulley for driving engine auxiliaries or accessories such as a fan, water pump, generator, air compressor, or the like.

Annular recesses 18 are provided on the outer portion of the inner faces of the members 16 and 17 to accommodate the loosely fitted annular frictional surfaced retainer plates 19. The rivets 20 secure the retainer plates 19 to the inertia member or mass 21 which is free to annular displacement without clockwise or counterclockwise limit with the exception of such restriction as may be imposed thereupon, depending upon the speed of the engine shaft 11 by the series of frictional blocks 22 which cooperate with the surfaces 23 of the damping system driving member 10 and are subject to the influence of springs 24 which are adapted to engage the outer ends of said blocks 22 and the inner surface of the expansible retainer member 25 which in turn is secured to the inertia member or mass 21 by the elements 26.

The retainer member 25 is so formed with alternate U-shaped profile 27 and inverted U-shaped profile 28 as to provide a plurality of nests for the spring members 24. The outer faces of the frictional blocks 22 may be recessed to receive the springs 24. The elements 26 may each be in the form of a stepped cylinder having one end secured to the retainer member 25 and the other end fitting within a bore 29 passing through the inertia member or mass 21. The springs 24 are normally under compression so that at zero R. P. M. of the shaft 11 the frictional blocks 22 are pressed against the surfaces 23 and at high speed the springs 24 are under higher compression as the blocks 22 are urged outwardly under the influence of centrifugal force.

In operation, under conditions of low speed the friction blocks 22 are pressed against the surfaces 23 of the driving member 10 and the torsional vibration which occurs at this speed will be damped by the friction which occurs between the spring pressed blocks 22 and the surfaces 23 and such friction as may occur between the retainer plates 19 and the recesses 18 on the outer portion of the inner faces of the members 16 and 17. As the speed of the engine increases, the amplitude of the torsional vibration will decrease due to centrifugal force and gyroscopic action, and correspondingly the damping effect of the friction blocks will decrease as under the influence of centrifugal force they will tend to move outwardly in a direction away from the surface 23 of the system driving member 10 until there is very little friction therebetween. However, even at high speeds the friction between the outer faces of the retainer plates 19 and the inner faces of the outer ends of the retaining disc 16 and retaining member 17 will still occur in an amount corresponding to the torsional vibration which takes place at high speed conditions.

Accordingly, it will be understood that the damping system of the present invention is adapted to automatically adjust itself to any and all conditions of speed and load and to thereby damp the torsional vibrations occurring in the engine shaft under a high load and speed demand. At low speeds and high load, the intensity of vibrations will be high and there will be present in the system a high frictional resistance as the friction blocks 22 cooperate with the surface 23 on the driving member 10 of the system. As a result, the correct corresponding amount of heat will be dissipated through the damping system. As the engine speed increases, the frequency of vibrations will also increase, but will be of relatively low intensity because of the influence of centrifugal force and gyroscopic action. As the speed increases, the friction blocks 22 tend to move in a direction away from the surface 23 of the driving member 10 and decrease the frictional resistance so that the inertia member or mass 21 is freer to move with the exception of such frictional resistance as may occur between plates 19 and the outer portions of the inner faces of the elements 16 and 17 and such limited resistance as occurs will correspond to the damping effect required to take care of the torsional vibration which occurs at high speed and is of low intensity but high frequency.

It will be obvious to those skilled in the art that various changes may be made without departing from the spirit of the invention and therefore the invention is not limited to what is shown in the drawings and described in the specification but only as indicated in the appended claims.

What is claimed is:

1. A torsional vibration damper comprising a driving member and an inertia member, said inertia member comprising an annular mass, a first damping element engaging said driving member, and a second damping element engaging said annular mass, means for making relatively ineffective said first damping element at relatively high speeds, said second damping element being relatively effective at high speeds to damp low amplitude high frequency vibration.

2. A torsional vibration damper comprising a driving member and an inertia member, said inertia member comprising a first friction element and a second friction element, said first friction element providing a damping effect corresponding to torsional vibration occurring at low speeds and high load, said second friction element providing a damping effect corresponding to high speeds and high load, and means for diminishing the effect of said first damping element at high speeds.

3. A torsional vibration damper for a multi-cylinder internal combustion engine comprising a propeller shaft, a driving member locked to said propeller shaft, an inertia member adapted to be frictionally driven by said driving member, said inertia member comprising a first damping element, an annular mass, and a second damping element secured to said annular mass, said first damping element being closer to the axis of said driving member, said second damping element being at a greater distance from the axis of said driving member than said first damping element and defining with said annular mass the outer periphery of said damper.

4. A torsional vibration damper for a shaft comprising a driving member, an annular mass defining the periphery of said damper and relatively movable with respect to said driving member, friction means interposed between said driving member and annular mass, and second friction means secured to said annular mass, said first friction means engaging said driving member at low speeds of said shaft to effectively damp high amplitude low frequency vibrations occurring therein, and moving outwardly at high speeds of said shaft in response to centrifugal force to damp low amplitude high frequency vibrations occurring therein, said second friction means being operatively engaged with said driving element and cooperating with said first friction means to effectively damp said vibrations occurring in said shaft at high speeds thereof.

5. A torsional vibration damper for a shaft comprising driving means, a first damping element adapted to frictionally engage said driving means, inertia means angularly movable with respect to said driving means, a second damping element secured to said inertia means and frictionally engaging said driving means, and means interposed between said inertia means and first damping element for limiting outer movement of said first damping element in response to centrifugal force, said first damping element being effective to damp high amplitude low frequency vibrations and cooperating with said second damping element to damp low amplitude high frequency vibrations.

6. A torsional vibration damper comprising a driving member and an inertia member, said inertia member comprising a plurality of friction blocks adapted to engage said driving member, a plurality of springs for forcing said friction blocks against said driving member, a retaining member for holding said springs under compression, an annular member defining the outer periphery of said damper, friction means secured to said annular member, and means adapted to frictionally engage said friction means and to interconnect said annular member to said driving member during high speeds thereof whereby vibrations occurring in said driving member are effectively damped.

7. A torsional vibration damper comprising a driving member and an inertia member, said inertia member comprising a first friction element engaging said driving member, an annular member, a second friction element secured to said annular member, and means engaging said second friction element and secured to said driving member for operatively interconnecting said driving member and said second friction element during high speeds of said driving member.

8. A torsional vibration damper comprising a driving member and an inertia member, said inertia member comprising a first damping element and a second damping element, said first damping element being responsive to centrifugal force under high speeds of said driving member to damp low amplitude high frequency vibrations, said second damping element being adapted to be frictionally interconnected to said driving member and cooperating with said first damping element to effectively damp the low amplitude high frequency vibrations.

References Cited in the file of this patent

UNITED STATES PATENTS

| | | |
|---|---|---|
| 1,743,776 | Hollnagel | Jan. 14, 1930 |
| 1,778,641 | Nelson | Oct. 14, 1930 |
| 1,916,086 | Tibbetts | June 27, 1933 |
| 1,967,446 | Meyer | July 24, 1934 |

FOREIGN PATENTS

| | | |
|---|---|---|
| 876,921 | France | Aug. 24, 1942 |